United States Patent [19]

Raiha

[11] 4,438,567
[45] Mar. 27, 1984

[54] CENTER LOCATOR FOR ALIGNMENT OF WORK TO MACHINE SPINDLE

[76] Inventor: Antti P. Raiha, Rte. #1, Box 512, Sandpoint, Id. 83864

[21] Appl. No.: 327,923

[22] Filed: Dec. 7, 1981

[51] Int. Cl.³ .............................................. G01C 1/00
[52] U.S. Cl. .................................. 33/286; 33/169 C; 33/172 D; 33/185 R
[58] Field of Search ................. 33/263, 169 C, 185 R, 33/189, 191, 275, 286, 227, 172 D; 408/16, 75; 356/138

[56] References Cited

U.S. PATENT DOCUMENTS

| | | | |
|---|---|---|---|
| 2,146,906 | 2/1939 | Moller | 33/286 X |
| 2,357,542 | 9/1944 | Pfeil | 353/42 |
| 2,376,700 | 5/1945 | Kinney | 33/263 |
| 2,414,733 | 1/1947 | Fuchs | 33/286 |
| 2,486,503 | 11/1949 | Stephens | 33/286 X |
| 2,510,479 | 6/1950 | Poer | 33/286 X |
| 2,557,029 | 6/1951 | Griffin | 33/286 X |
| 3,505,739 | 4/1970 | Abrams | 33/189 X |
| 3,728,027 | 4/1973 | Watanabe | 33/286 X |

FOREIGN PATENT DOCUMENTS

| | | | |
|---|---|---|---|
| 2606378 | 9/1976 | Fed. Rep. of Germany | 408/16 |
| 53-137353 | 11/1978 | Japan | 33/286 |

*Primary Examiner*—Harry N. Haroian
*Attorney, Agent, or Firm*—Fred Flam

[57] ABSTRACT

A hollow barrel has a shank at one end which connects to the chuck of a machine tool. A simple lamp and lens system at the barrel axis projects an image through the other end of the barrel to the work surface. The work is movable to align a mark or hole on its surface with the projected image, whereupon the work is clamped in place, the barrel removed, and the machine operation performed.

2 Claims, 8 Drawing Figures

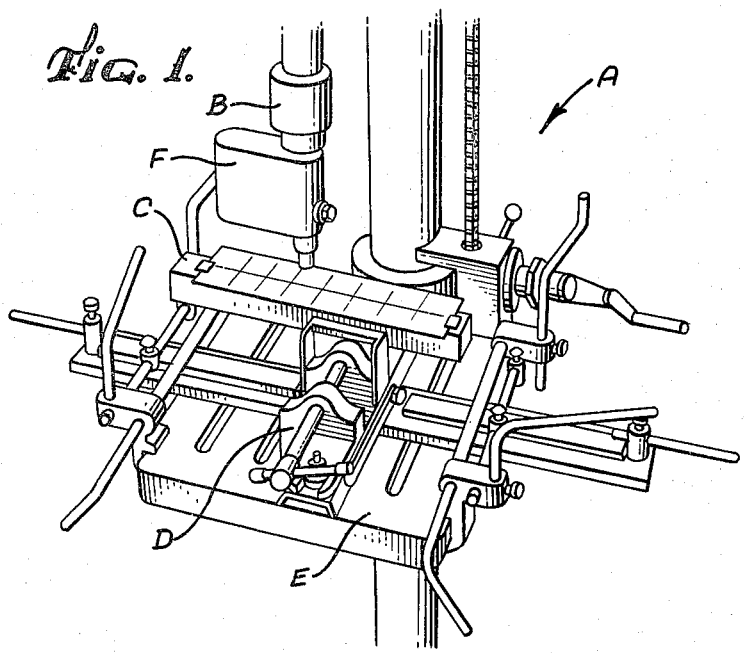
Fig. 1.
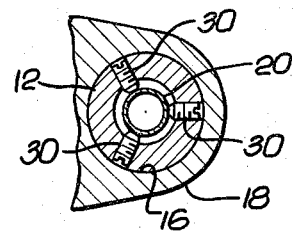
Fig. 3.
Fig. 2.
Fig. 4.
Fig. 5.
Fig. 6.
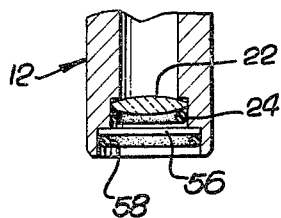
Fig. 8.
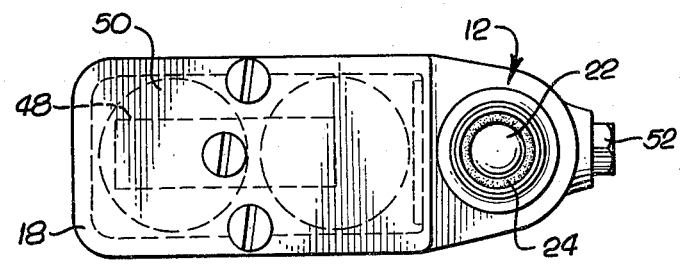
Fig. 7.

CENTER LOCATOR FOR ALIGNMENT OF WORK TO MACHINE SPINDLE

FIELD OF INVENTION

This invention relates to machine operations and, particularly, to apparatus for locating the work so that a mark or hole is precisely centered on the axis of the machine spindle.

BACKGROUND OF THE INVENTION

An ever present machine shop problem is to locate a reference point on the workpiece relative to the center of a drill spindle or the like. The problem exists whatever may be the scale of the machine shop operation, from a large scale production shop utilizing digital or computer control of worktables, to a small home or experimental shop. Excellent but very expensive viewer microscope equipment exists.

Small job shops have used simple pointed instruments placed in the chuck of the machine. Such pointed instruments, when moved into position, obscure the reference mark on the workpiece which, of course, an optical instrument does not. If the pointed instrument has a flexible shaft and if the reference mark is an indentation or small hole, then concentricity can be verified if the instrument with its point in the indentation or hole does not wiggle or laterally vibrate when the machine is power rotated. An optical instrument has precision measurement capabilities that the mechanical instrument does not have. For example, an optical instrument, by projecting scale markings around the optical center, can assist in finding a point exactly half way between two references. The primary object of the present invention is to provide very simple optical instrument which can be priced so low that its purchase unquestionably can be justified for use in any shop, however small.

SUMMARY OF INVENTION

The essential feature of my optical instrument is that, instead of viewing the illuminated workpiece as through binocular or monocular eyepieces, a grid pattern or point is projected upon the workpiece itself. The projector comprises a barrel housing a lamp and lens, the barrel having a shank connected to the workpiece chuck. As an additional feature, the barrel is made in two parts—a chuck part and an optical part. The optical part is angularly movable so that the projected grid pattern can be moved into alignment with the reference on the workpiece. Axial movement of the optical part conveniently serves to switch the projector on and off. Batteries are housed in a case attached to the chuck part. The case provides a slidable housing for the optical barrel part.

BRIEF DESCRIPTION OF THE DRAWINGS

A detailed description of the invention will be made with reference to the accompanying drawings wherein like numerals designate corresponding parts in the several figures. These drawings, unless diagrammatic or unless otherwise indicated, are to scale.

FIG. 1 is a pictorial view of the locator attached to a drill press chuck and positioned relative to a workpiece.

FIG. 2 is a axial sectional view of the locator.

FIG. 3 is a transverse sectional view taken along a plane corresponding to line 3—3 of FIG. 2.

FIGS. 4, 5 and 6 are diagrams indicating lens options.

FIG. 7 is a lower elevational view of the locator.

FIG. 8 is a fragmentary axial sectional view showing the use of a grid or plate to project an image.

DETAILED DESCRIPTION OF THE PREFERRED EMBODIMENT

The following detailed description is of the best presently contemplated mode of carrying out the invention. This description is not to be taken in a limiting sense, but is made merely for purposes of illustrating the general principles of the invention, since the scope of the invention is best defined by the appended claims.

In FIG. 1 there is illustrated a machine tool, in this instance, a drill press A having a tool holder in the form of a chuck B connected to its power spindle. A workpiece C is clamped to a vise D. The vise D is, in turn, clamped to the work table E at a selected position by the aid of a clamp mechanism such as shown and described in my copending patent application Ser. No. 311,997, filed Oct. 16, 1981 entitled *DRILL TABLE VISE LOCK AND POSITIONING GUIDE.*

Before the workpiece C is clamped to the work table E, it is accurately located by the aid of markings fixed to it. The markings can be applied to the workpiece by the scribing lines through paint applied to the workpiece surface. Alternately, and as shown in FIG. 1, a layout drawing can be adhered to the surface, the layout drawing indicating the precise centers for machine or drill press operations.

In order to align the center markings applied to the workpiece with the spindle axis, the locator F projects a suitable image which is precisely centered on the machine spindle axis. The locator or projector F comprises a two-part barrel 10, 12, one of the parts 10 having a reduced substantially cylindrical shank 14 at one end designed to be connected to the chuck B. The barrel part 10 fits into the upper end of a through bore 16 of a case 18 and is rigidly connected thereto by any suitable means. The companion barrel 12 is slidably mounted in the lower end of the case bore 16. A low voltage tungsten filament lamp 20 is mounted at the upper or inner end of the barrel part 12, and a six or eight power biconvex lens 22 is mounted at the lower or outer end of the barrel part 12. An oversized neoprene O-ring 24 holds the lens 22 against a shoulder 26 in the barrel part 12. The O-ring 24 is easily removed and replaced for installation of a selected lens. The lamp 20 has a central electrically conductive flange 28 seated at the end of the barrel part 12. Three relatively soft plastic set screws 30 (see FIG. 3) delicately engage the neck of the bulb part of the lamp 20 to hold the lamp in position. Adjustment of the screws 30, as at the factory, center the lamp filament at the axis of the device.

In order to energize the lamp 20, two batteries 32 and 33 are provided. The batteries are mounted in a cavity 34 of the case 18. An electrical circuit for the lamp 20 is completed upon movement of the barrel part 12 upwardly until the center contact 36 of the lamp 20 engages a contact spring 38. The spring 38 has an end located near the bottom of a recess 40 in the barrel part 10. The recess 40 receives the base of the lamp 20. A non-conductive stop 42 spaces the contact spring 38 from the bottom of the recess 40.

The contact spring 38 extends laterally through clearance openings 44 in the barrel part 10 and in the adjacent wall of the case so that the opposite end of the spring 38 is positioned to engage the center contact of one of the batteries 32. A plastic retainer 46 made of non-conductive plastic is press fitted into an aperture of the case and mounts the spring 38. A bridge spring 48 carried by a non-conductive cap 50 for the cavity 34 connects battery 33 to battery 32. The other end of battery 33 electrically contacts the case 18. The case 18 carries a hollow screw 52 that projects into the bore 16 and into an annular recess in the barrel part 12. A conductive coiled compression spring 54 carried by the screw engages the barrel part 12, completing a circuit to the flange 28 of the lamp 20. The lamp filament itself completes the circuit between the external flange 28 and the contact button 36.

Simply by sliding the barrel part 12 in and out, the circuit for the projector is closed and opened. The screw 52 limits the outward movement of the barrel part 12.

The lamp 20 and lens 22 project an image upon the reference marks or lines on the workpiece. A spot (FIG. 4), or a black cross hair (FIG. 5) or a white cross hair (FIG. 6), or other grid patterns can be projected upon the workpiece. The pattern is produced in the present instance simply by printing or etching the lens itself. A separate grid or plate 56 could, of course, be provided such as indicated in FIG. 8. The plate or grid 56 is releasably held by a supplemental O-ring 58. The plate may be made of any suitable material and may provide any suitable pattern, from a pinhole to something more complex.

Instead of achieving focusing by an auxiliary mechanism in the projector itself, focusing is achieved by movement of the work table relative to the entire projector. The simplicity of the projector mechanism is thus uncompromised.

After focusing, coincidence of the center mark on the workpiece with the center of the projected image is achieved by transverse movement of the vise D. Cross lines on the workpiece and cross hairs on the projected image can be made parallel by angularly moving the barrel part 12. Once alignment is achieved, the workpiece is clamped to the table and the drill bit or other tool is installed in the chuck.

Intending to claim all novel, useful and unobvious features shown or described, I make the following claims:

1. A center locator for use with a drill press or like tool having a rotatable spindle and a chuck or other tool holder attached to an end of the spindle:
   (a) a case or housing of electrically conductive material having a shank for coaxial connection to said chuck or tool holder;
   (b) said case having a bore aligned with the shank axis;
   (c) a barrel part guidingly mounted in said case bore for angular movement about said shank and bore axis, as well as for axial movement therein, said barrel part being made of electrically conductive material;
   (d) said barrel part having an annular groove;
   (e) a retractable hollow screw mounted on the case and cooperable with said annular groove for limiting axial movement of said barrel part;
   (f) An incandescent lamp having a bulb part extending into the inner end of the barrel and having a flange of electrically conductive material in engagement with the said end of the barrel part, said lamp having a contact button located beyond the inner end of the barrel;
   (g) means cooperable with the lamp bulb for holding the lamp to the barrel, comprising three relatively soft plastic screws adjustable to center the lamp at the axis;
   (h) a magnifying lens accommodated in the opposite outer end of the barrel and fitted against a shoulder in the barrel;
   (i) a resilient O-ring frictionally fitted in the barrel releasably to hold the lens in place;
   (j) said lens having pattern means imprinted or otherwise formed thereon;
   (k) spring contact means carried by the case for engagement with said lamp contact button upon axial movement of said barrel;
   (l) a coiled contact spring in said screw and in continuous wiping contact with said barrel part; and
   (m) batteries carried by the case and imposing an electrical potential between the case and said spring contact means.

2. A center locator for use with a machine tool having a spindle:
   (a) a case or housing having a shank for coaxial connection to the spindle;
   (b) said case having an opening opposite the shank;
   (c) a barrel part slidably mounted by the case for movement angularly about the shank axis and longitudinally parallel to the shank axis;
   (d) projector means in the case and mounted on said barrel part, including a lamp mounted at the shank axis for projecting a beam of light through the opening, a lens and means cooperating with the lens to produce a spot or pattern on the workpiece;
   (e) angular movement of said barrel part serving to align the spot or pattern with reference marks on the workpiece; and
   (f) means for energizing the lamp, said energizing means comprising batteries packed in the case and switch means comprising a contact engaged by the lamp upon longitudinal movement of said barrel part.

* * * * *